(12) United States Patent
Jun

(10) Patent No.: US 6,480,237 B1
(45) Date of Patent: Nov. 12, 2002

(54) VESTIGIAL SIDEBAND MODE DETECTION APPARATUS IN DIGITAL TELEVISION RECEIVER

(75) Inventor: Jung Sig Jun, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 09/475,134

(22) Filed: Dec. 30, 1999

(30) Foreign Application Priority Data

Dec. 31, 1998 (KR) ............................................ 98-62822

(51) Int. Cl.[7] ................................................ H04N 5/46
(52) U.S. Cl. ........................ 348/558; 348/21; 348/607; 348/614; 348/725; 375/270
(58) Field of Search ......................... 348/21, 470, 554, 348/558, 607, 608, 614, 678, 725; 375/270; H04N 5/46

(56) References Cited

U.S. PATENT DOCUMENTS

| | | | | |
|---|---|---|---|---|
| 5,508,748 A | * | 4/1996 | Krishnamurthy et al. | 341/56 |
| 5,594,496 A | * | 1/1997 | Nielsen et al. | 348/21 |
| 5,675,284 A | * | 10/1997 | Sgrignoli | 329/357 |
| 5,745,528 A | * | 4/1998 | Fimoff et al. | 348/470 |
| 5,764,309 A | * | 6/1998 | Krishnamurthy et al. | 330/278 |
| 5,828,404 A | * | 10/1998 | Krishnamurthy et al. | 348/21 |
| 5,886,748 A | * | 3/1999 | Lee | 348/21 |
| 5,949,834 A | * | 9/1999 | Laud et al. | 375/368 |
| 5,973,725 A | * | 10/1999 | Lee | 348/21 |
| 5,978,424 A | * | 11/1999 | Turner | 348/495 |
| 5,987,070 A | * | 11/1999 | Fimoff et al. | 375/264 |
| 6,052,158 A | * | 4/2000 | Nielsen | 348/725 |
| 6,084,642 A | * | 7/2000 | Krishnamurthy | 348/500 |
| 6,133,959 A | * | 10/2000 | Kwak | 348/525 |
| 6,229,560 B1 | * | 5/2001 | Jun | 348/21 |
| 6,281,945 B1 | * | 8/2001 | Jun et al. | 345/725 |

* cited by examiner

Primary Examiner—John Miller
Assistant Examiner—Brian Yenke
(74) Attorney, Agent, or Firm—Birch, Stewart, Kolasch & Birch, LLP

(57) ABSTRACT

A method and system for detecting a VSB mode in a digital TV receiver is disclosed. The system includes first and second VSB mode detectors implemented before and after a channel equalizer. The first VSB mode detector detects a VSB mode from a signal before channel-equalization, the second VSB mode detector detects a VSB mode from a channel-equalized signal, and one of the detected VSB modes is output to the channel equalizer as the finally detected VSB mode.

16 Claims, 3 Drawing Sheets

| segment synchronizing signal (4symbols) | PN511 (511 symbols) | PN63 (63 symbols) | PN63* (63 symbols) | PN63 (63 symbols) | VSB mode (24 symbols) | not used (92 symbols) | symbol data (12 symbols) |
|---|---|---|---|---|---|---|---|

VESTIGIAL SIDEBAND MODE DETECTION APPARATUS IN DIGITAL TELEVISION RECEIVER

BACKGROUND OF THE INVENTION

1. Field of the Invention

The present invention relates to a digital TV receiver and more particularly to a vestigial sideband mode detecting apparatus in a digital TV receiver.

2. Discussion of Related Art

The vestigial sideband (VSB) mode proposed by the Advanced Television Standard Committee (ATSC) includes 8VSB mode for a terrestrial broadcasting and 16VSB mode for a cable broadcasting. Also, there are 2, 4, 8 and 16VSB modes used for the Multi-channel Multi-point Distribution System (MMDS) channel. The 16VSB of the ATSC and the 16VSB of the MMDS are used in different channels but are transmitted by the same transmission mode and are in the same mode. Consequently, there are currently five VSB modes.

The 2VSB means two codes (one bit) are assigned to one symbol. Similarly, the 4VSB means four codes (two bits) are assigned to one symbol, the 8VSB means eight codes (three bits) are assigned to one symbol, and the 16VSB means sixteen codes (four bits) are assigned to one symbol.

Also, the 2VSB means two codes (one bit) are assigned to one symbol. Similarly, the 4VSB means four codes (two bits) are assigned to one symbol, the 8VSB means eight codes (three bits) are assigned to one symbol, and the 16VSB means sixteen codes (four bits) are assigned to one symbol.

Before transmission from a transmitting side such as a broadcasting station, the signal to be transmitted is passed through a mapper by which the signal is changed into desired power levels. For a ground broadcasting type of 8VSB, the output level of the mapper corresponds to one of 8-step symbol values (amplitude level) −7, −5, −3, −1, 1, 3, 5, 7. Moreover, according to predetermined agreement, the mapper forcibly inserts four symbols of a data segment synchronizing (sync) signal for every 832 symbols and forcibly inserts a field sync signal in the position of every 313th data segments.

With two logic levels, a prescribed logic level of the data segment hsync signal '1, 0, 0, 1' is continually repeated in every data segment. The output level of the mapper is '120' if the data sync signal is in a logic level of '1' and the output level of the mapper is '−120' if the data segment sync signal is in a logic level of '0'. Namely, the data segment sync signal has only the two logic levels, which are continually repeated in every data segment. The data segment and field sync signals are similar to a horizontal and vertical sync signals of the NTSC broadcasting signals, respectively, but do not have the same form.

FIG. 1 is a block diagram of the DTV system. When RF signals modulated according to the VSB system are received through an antenna, a tuner 11 selects a desired channel frequency by tuning and converts the frequency into an IF signal. A frequency-phase locking loop (FPLL) 12 demodulates the IF signal from the tuner 11 into baseband signals I and Q to lock the output phase and frequency. The FPLL 12 is a circuit unifying both a frequency tracking loop and a phase-locking loop, but the frequency is locked prior to the phase.

An analog/digital (A/D) converter 13 converts the I signal into digital data of a given bit number (for example, 10 bits). The Q signal is used for carrier restoration within the FPLL 12. Using the converted digital data of a given bit number, a sync signal recovery unit 14 recovers the synchronization signal to be used for timing recovery and equalization.

The sync signal recovery unit 14 restores the data segment sync signal and the field sync signal, inserted in the RF signal by the transmission side. Namely, the standardized VSB transmission signal includes the specific sync signal patterns within the transmitted data which allows a receiver to easily recover the sync signals. Because the sync signals allow an easy data recovery, an erroneous detection and recovery of the sync signals adversely affect the overall system.

An equalization unit 15 uses the data segment and data field sync signals as training signals in an equalization. The equalization is performed to correct linear distortion of amplitude which causes interference between symbols, and to reduce ghost generated by reflection of the transmitted signal off of mountains and buildings. Afterwards, an error corrector 16 corrects errors that may have occurred during transmission through the channel. A video decoder 17 decodes the equalized and error corrected signal according to the moving picture expert group (MPEG) algorithm, allowing the TV audience to watch a broadcasting through a display.

The digital TV receiver as described above is required for the operation of CATV MMDS as well as terrestrial broadcasting. Thus, a compatibility is necessary, which requires a correct detection of the VSB mode of data currently being received by the digital TV receiver.

However, if the reception channel being used has a large amount of noise, the VSB mode signal would continuously have errors. In such case, the correct VSB mode cannot be detected. This problem occurs especially when severe ghost noise exists in the channel because a same signal would be repeated in every field sync signal section. Moreover, the ghost noise may delay the original signal and add the delayed signal to the current original signal. Thus, a signal with an error due to the effects of the delayed signal may be input during the VSB mode signal section.

If the detected VSB mode is not the correct VSB signal due to a ghost noise existing in the transmission channel, the equalizer 15 and the error corrector 16 would operate using the wrong VSB mode. Particularly, as the equalizer 15 operates mainly using the field sync signal section, an incorrect VSB mode does not significantly affect the operation. This is because the field sync signals for all VSB modes have the same form, although having different magnitudes. However, if an incorrect VSB mode is detected, the error corrector 16 cannot properly restore the data, thereby affecting the operation of the entire digital receiver.

SUMMARY OF THE INVENTION

Accordingly, an object of the present invention is to solve at least the problems and disadvantages of the related art.

An object of the present invention is to provide a VSB mode detecting apparatus in a digital TV receiver, which can easily detect a VSB mode even with noise in a channel.

Another object of the present invention is to provide a VSB mode detecting apparatus in a digital TV receiver, which detects a VSB mode using only the code bit of the input digital data.

Additional advantages, objects, and features of the invention will be set forth in part in the description which follows and in part will become apparent to those having ordinary skill in the art upon examination of the following or may be learned from practice of the invention. The objects and advantages of the invention may be realized and attained as particularly pointed out in the appended claims.

To achieve the objects and in accordance with the purposes of the invention, as embodied and broadly described herein, a VSB mode detecting apparatus of a digital TV receiver includes a first and a second VSB mode detectors prior to and after a channel equalizer, in which the first VSB mode detector detects a VSB mode from a pre-channel-equalized signal and the second VSB mode detector detects a VSB mode from a channel-equalized signal. The VSB mode detected by the first VSB mode detector is output to the channel equalizer when the two VSB modes are identical and the VSB mode detected by the second VSB mode detector is output to the channel equalizer otherwise.

BRIEF DESCRIPTION OF THE ATTACHED DRAWINGS

The invention will be described in detail with reference to the following drawings in which like reference numerals refer to like elements wherein.

DETAILED DESCRIPTION OF PREFERRED EMBODIMENT

Reference will now be made in detail to the preferred embodiments of the present invention, examples of which are illustrated in the accompanying drawings.

Figures 1, 2:
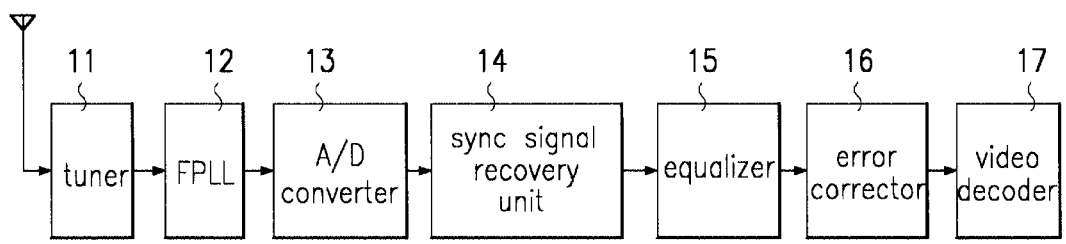
FIG. 1 is a block diagram of a digital TV receiver in the related art.
FIG. 2 shows a configuration of the field synchronizing signal into which a VSB mode is inserted.

Generally, a VSB mode information is inserted within a field sync signal by a transmission side before transmission. The field sync signal is inserted in every 313 data segment position as one data segment, and a VSB mode region of 24 symbols (or bits) is inserted within the one data segment. As shown in FIG. 2, the 24 symbols are divided into three equal regions of 1 byte, each byte having 8 symbols. The present invention will focus on the last 8 symbols, i.e. the last byte.

Particularly, the last byte of 8 bits are divided again into two regions of 4 bits. The first 4 bits include one bit of parity P and 3 bits of data (A,B,C) having information on a current VSB mode. The second 4 bits include an inverted data bits ($\overline{P}, \overline{A}, \overline{B}, \overline{C}$) of the first 4 bits (P,A,B,C). From the first 4 bits, the parity P makes the number of '1's in the 4 bits to be an even number, and values of the A, B, C are predetermined to define a VSB mode.

Figure 3:
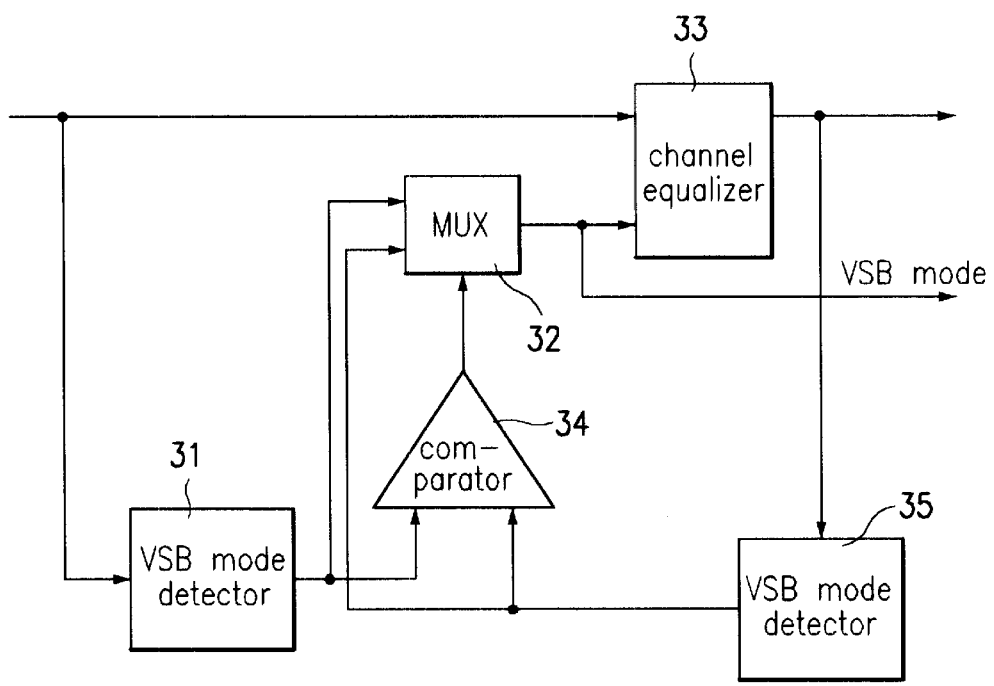
FIG. 3 is a block diagram of a VSB mode detecting apparatus in a digital TV receiver according to the present invention.

Thus, the transmitting side inserts the data corresponding to the predetermined VSB mode into the field sync signal interval. As discussed above, two power levels of +120 and −120 designate the symbol signals of the field sync signal which includes the respective VSB mode. The present invention is designed to permit a digital TV receiver to receive a terrestrial broadcasting as well as a cable MMDS broadcasting with minimal additions to the existing hardware by detecting a VSB mode using the code bits in a received data. FIG. 3 illustrates a digital TV receiver including a VSB mode detecting apparatus according to the present invention.

Referring to FIG. 3, a digital TV receiver according to the present invention includes a first VSB mode detector 31 which detects a VSB mode from an input digital signal; a channel equalizer 33 which performs channel equalization of the input digital signal to remove ghosts which may have been inserted; a second VSB mode detector 35 which detects a VSB mode from the output signal of the channel equalizer 33; a comparator 34 which compares the outputs of the first and second VSB mode detectors 31 and 35, and generates a select signal according to the compared result; and a multiplexer (MUX) 32 which selects the VSB mode signal detected by either the first VSB mode detector 31 or the second VSB mode detector 35 according to the select signal generated by comparator 34, and outputs the selected VSB mode to the channel equalizer 33.

Figure 4:
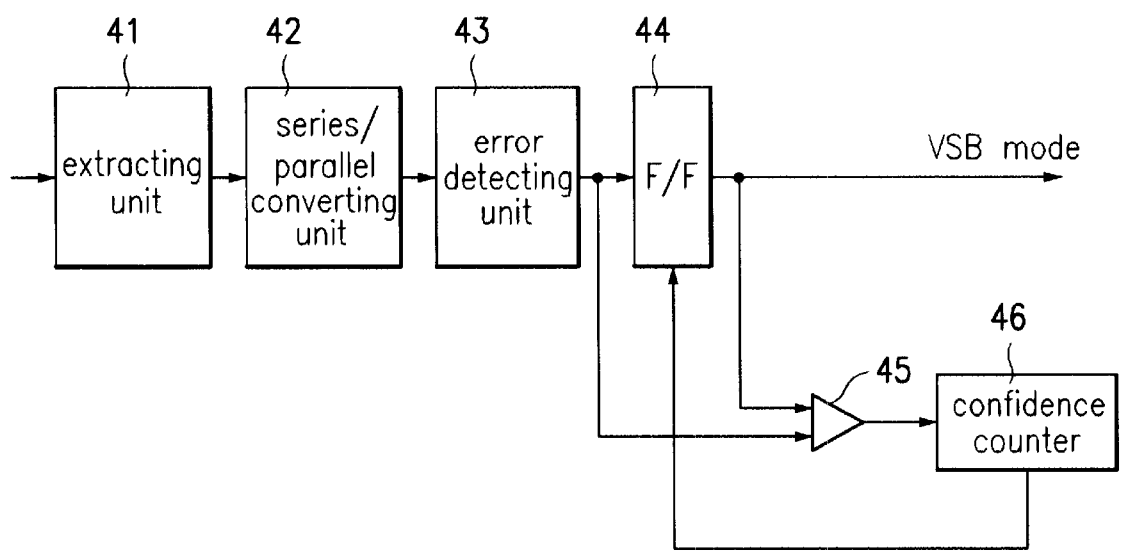
FIG. 4 is a block diagram of the VSB mode detectors of FIG. 3.

Although any apparatus for detecting a VSB mode may be utilized for the VSB mode detectors 31 and 35, FIG. 4 shows a preferred embodiment of a VSB mode detector which has been disclosed in co-pending application Ser. No. 09/203, 369 entitled "Device for Detecting VSB Mode in Digital TV Receiver," and is fully incorporated herein.

Referring to FIG. 4, each of the VSB mode detectors 31 and 35 includes a code bit extracting unit 41 which extracts the most significant bit having the code information from the received digital data of the fixed bits (for example 10 bits) and outputs the data in series. Particularly, the last byte region or 8 symbols of the VSB mode interval contains the code information of 8 bits. A series/parallel converting unit 42 delays each code bit from the code bit extracting unit 41 by successive clocked delays (8 clocks, for example) for a prescribed period and timely outputs the delayed signals in parallel according to an enable signal. An error detecting unit 43 detects the presence of error which may have occurred during the transmission of the data through a transmission channel. A flip-flop (F/F) 44 stores the data (A,B,C) having an actual VSB mode information from the series/parallel converting unit 42 when an enable signal is externally received. A comparator 45 compares to determine if the data forwarded to the flip-flop 44 and the data stored in the flip-flop 44 are identical.

A confidence counter 46 accumulates a confidence value by increasing or decreasing confidence level according to the result of the comparison in the comparator 45. If the accumulated confidence is below a particular threshold value, the confidence counter 46 outputs the enable signal to the flip-flop 44. If an error is detected by the error detecting unit 43, the confidence counter 46 stops the operation of all the foregoing blocks and waits for the next VSB mode signal interval in the field sync signal. The signal output by the flip-flop 44 is the detected VSB mode signal, and the series/parallel converting unit 42 and the confidence counter 46 are enabled with one clocked delay, by for example a second flip-flop.

As discussed above, the device for detecting a VSB mode in a digital TV receiver according to the present invention is operative during a VSB mode signal interval in a field sync signal. More specifically, the device for detecting a VSB mode in a digital TV receiver according to the present invention utilizes the last 8 symbol data P,A,B,C,$\overline{P},\overline{A},\overline{B},\overline{C}$ from the 24 symbols of the VSB mode related information contained in a field sync signal when the field sync signal is detected by the sync signal recovery unit 14 of FIG. 1. Also, each symbol will have a fixed number of bits, for example 10 bits, after passing through the A/D converter 13. In an ideal case without a noise factor, all of the data in a field sync signal interval has a value of +120 or −120.

Accordingly, the code bit extracting unit 41 extracts the most significant bit which includes the code information from the 10 bit digital data, and outputs to the series/parallel converting unit 42 a '1' if the most significant bit is positive and a '0' if the most significant bit is negative. The series/parallel converting unit 42 sequentially delays and stores the outputs of the code bit extracting unit 41 by a predetermined number of clocks (for example eight clocks). Upon receiving the final symbol of the eight VSB symbol, the series/parallel converting unit 42 simultaneously outputs to the error detecting unit 43 the stored symbols and the final symbol. The 8-bit data output in parallel is P,A,B,C,$\overline{P},\overline{A},\overline{B},\overline{C}$. Namely, the series/parallel converting unit 42 accumulates serially input data for eight clocks and simultaneously outputs the 8-bit data, P,A,B,C,$\overline{P},\overline{A},\overline{B},\overline{C}$.

The error detecting unit 43 detects errors which may have been generated in the data output by the series/parallel converting unit 42. If there is no error in the 8-bit data, P,A,B,C,$\overline{P},\overline{A},\overline{B},\overline{C}$, output by the series/parallel converting unit 42, (P,A,B,C) would respectively have inverted relations to ($\overline{P},\overline{A},\overline{B},\overline{C}$). Also, the number of '1's in the first four bits of data (P,A,B,C) is maintained to be an even number by the parity bit (P), and the number of '1's of lower four bits ($\overline{P},\overline{A},\overline{B},\overline{C}$) is also maintained by the parity ($\overline{p}$). Accordingly, a generation of an error in the eight symbol data of the VSB mode signal may be detected using the inverted relation, by for example an exclusive NOR gate comparing the inverted relations.

The output of the error detecting unit 43 is received by the confidence counter 46. If an output of the error detecting unit 43 is '1,' the confidence counter 46 determines that an error has occurred and stops the operations to wait for the next VSB mode signal interval in the field sync signal. The operations of the confidence counter 46 are also disabled and the previous count value is maintained until the confidence counter is enabled by the next VSB mode signal interval.

If an error is not detected in the error detecting unit 43, the three bits A, B, C from the series/parallel converting unit 42 having the VSB mode information are forwarded to the flip-flop 44. The flip-flop 44 receives the 3 bits of data, but does not store the data until the confidence counter 46 outputs an enable signal. The confidence counter 46 generates and outputs a disable signal to the flip-flop 44 if the confidence value is greater than a particular threshold value, and outputs an enable signal if the confidence value is smaller than the particular threshold value. The particular threshold value is predetermined by the designer. For example, the threshold value in this invention may be set to '1.' The confidence counter 46 either increases or decreases a count value according to an output of the comparator 45. The comparator 45 compares the 3 bits of data forwarded to the flip-flop 44 and the 3 bits of data already stored in the flip-flop 44. The results of the comparison is output to the confidence counter 46.

In the preferred embodiment of the present invention, a VSB mode signal '101' for a terrestrial broadcasting is set in the flip-flop 44 as an initial or default value when the system resets by, for example, a reset signal. If the VSB mode signal inserted by the transmission side is also a '101' for a terrestrial broadcasting, the comparator 45 outputs a '1' because the data stored in the flip-flop 44 and the data forwarded would match. When a value of '1' is output from the comparator 45, the confidence counter 46 increases a count value by 1 step, changing the confidence accumulated in the confidence counter 46 from 0 to 1.

There is one clock difference between the input and the output of the confidence counter 46. Accordingly, even when the. count value is changed from '0' to '1' by the input, the confidence counter 46 would output an enable signal to the flip-flop 44 according to the previous value of '0' and the flip-flop 44 stores the received 3 bit data '101.' Because the VSB mode signal remains the same until a power on/off or a channel change is made, the data forwarded thereafter to the flip-flop 44 at every VSB mode signal interval in the field sync signal will be '101' and the outputs of the comparator 45 will be also be '1'.

The confidence counter 46 increases the confidence by one step each time an enable signal, i.e. a value of '1,' is received from the comparator 45. If the count value of the confidence counter 46 is greater than the particular threshold value, for example 1, the flip-flop 44 receives a disable signal and does not store the received data. Thus, the flip-flop 44 is essentially disabled, thereby preventing a value other than the actual VSB mode signal from being output as the VSB mode signal in case a value other than the VSB mode signal is forwarded due to an error.

As described above, the first VSB mode detector 31 detects the error using the 8-symbol VSB mode signal input for every field sync signal section. When an error is detected, the subsequent blocks stop operation and wait for a VSB mode signal of the next field sync signal. However, if the reception channel being used has a large amount of noise, the VSB mode signal would continuously have errors. When a signal with an error due to the effects of the noise is input during the VSB mode signal section, the first VSB mode detector 31 cannot operate correctly, thereby affecting the operation of the data restoration. Accordingly, in the present invention, the VSB mode signal detected by the second VSB mode detector 35 is used.

Particularly, the ghost noise existing in the channel may be significantly removed by the channel equalizer 33. Although the VSB mode signal before channel equalization may have 20 continuous error due to the ghost noise, a channel equalized VSB mode signal would not contain the ghost noise. Accordingly, an erroneous operation of the first VSB mode detector 31 due to the ghost noise can be prevented by implementing the second VSB mode detector 35 as shown in FIG. 3 to detect the VSB mode utilizing the output of the channel equalizer 33.

Referring to FIG. 3, the first VSB mode detector 31 detects the VSB mode from the input signal, i.e. the signal before channel equalization. The detected VSB mode signal is initially input to the channel equalizer 33 for channel equalization. Namely, the channel equalization is initially performed using the VSB mode signal detected by the first VSB mode detector 31 because the channel equalizer 33 cannot correctly operate without a VSB mode. Subsequently, the second VSB mode detector 35 detects the VSB mode from the channel-equalized signal output by the channel equalizer 33.

Thereafter, the comparator 34 compares the VSB mode signal detected by the first VSB mode detector 31 with the VSB mode detected by the second VSB mode detector 35. The VSB mode signal detected by the first VSB mode detector 31 is judged to be correct when the two compared signals are substantially identical and is judged to be erroneous otherwise. According to the compared result, the comparator 34 outputs an appropriate select signal to the MUX 32.

The MUX 32 selects and outputs to the channel equalizer 33 the VSB mode signal detected by the first VSB mode detector 31 based upon a first select signal when the two detected VSB mode signals are substantially identical. The MUX 32 selects and outputs to the channel equalizer 33 the VSB mode signal detected by the second VSB mode detector 35 based upon a second select signal when the two VSB mode signals are different. Thus, the probability of detecting and outputting a correct VSB mode signal increases, thereby increasing the efficiency of the digital TV receiver for the CATV MMDS as well as the terrestrial broadcasting.

Therefore, in the VSB mode detecting apparatus for a digital TV receiver of the present invention, a VSB mode is detected from a signal before channel equalization and a VSB mode is detected from a channel-equalized signal, and the VSB mode signal detected before channel-equalization is judged to be the correct VSB mode when the two VSB mode signals coincide. Otherwise, the VSB mode signal after channel equalization is judged to be the correct VSB mode. Accordingly, the VSB mode can be correctly and easily detected even in the presence of severe ghost noise in the channel, thereby improving the performance of the system. Moreover, the VSB mode inserted at the transmission side may be detected using only the most significant bit having the code information among the input digital data, thereby simplifying the circuit configuration. This facilitates implementation and integration of the system and reduces the size of the IC, resulting in a decrease in the cost.

The foregoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A digital TV receiver for detecting a VSB mode, comprising:
    a first VSB mode detector which detects a first VSB mode from an input digital signal;
    an equalizer which performs channel equalization on the input digital signal to remove ghost noise existing in a channel and outputs a channel-equalized signal excluding the ghost noise;
    a second VSB mode detector which receives the channel-equalized signal excluding the ghost noise and detects a second VSB mode from the channel-equalized signal excluding the ghost noise;
    a comparator which compares the first and second VSB mode signals and generates a select signal according to the compared result; and
    a selector which selects and outputs to the channel equalizer one of either the first VSB mode signal or the second VSB mode signal based upon the select signal.

2. A digital receiver of claim 1, wherein the first and second VSB mode detectors each comprises:
    a code bit extracting unit which extracts and outputs a most significant bit having code information from the input digital signal;
    a series/parallel converting unit which sequentially delays code bits serially output by the code bit extracting unit for a prescribed period and outputs in parallel the delayed code bits according to a first enable signal;
    an error detecting unit which detects a presence of error in the parallel data output by the series/parallel converting unit;
    a storage which stores data having actual VSB mode information among the parallel data upon receiving a second enable signal, and outputs the stored data as a VSB mode signal;
    a comparator which compares the parallel data input to the storage with the stored data of the storage when the error detecting unit detects no error; and
    a confidence counter which increases or decreases a confidence value according to the compared result, and outputs the second enable signal to the storage when the confidence value meets a predetermined condition.

3. A digital receiver of claim 2, wherein the code bit extracting unit operates during last eight symbols of the VSB mode signal section in a field synchronizing signal.

4. A digital receiver of claim 2, wherein the first enable signal of the series/parallel converting unit is generated when a code bit of a final VSB symbol is input to the series/parallel converting unit.

5. A digital receiver of claim 2, wherein the confidence counter maintains the confidence value until a next VSB mode signal section when the error detecting unit detects an error.

6. A digital receiver of claim 1, wherein the comparator outputs a first select signal to select the first VSB mode signal when the first and second VSB modes are substantially identical, and otherwise outputs a second select signal to select the second VSB mode signal.

7. A digital receiver of claim 1, further comprising:
    a tuner which selects a desired channel frequency by tuning when an RF signal is received through an antenna, and converts the RF signal into an intermediate frequency (IF) signal;
    an A/D converter which modulates the IF signal into I and Q signals in a base band to lock its frequency and phase, and converts the I and Q signals into the input digital signal of a predetermined bit;
    a sync signal recovery unit which detects a data segment sync signal and a field sync signal from the input digital signal; and
    a data decoder which decodes the channel-equalized signal using a VSB mode signal output from the selector and the sync signals detected by the sync signal recovery unit, and displays the decoded signal.

8. A digital receiver of claim 1, wherein the first VSB mode detector comprises:
    a code bit extracting unit which extracts and outputs a most significant bit having code information from the input digital signal;
    a series/parallel converting unit which sequentially delays code bits serially output by the code bit extracting unit for a prescribed period and outputs in parallel the delayed code bits according to a first enable signal;
    an error detecting unit which detects a presence of error in the parallel data output by the series/parallel converting unit;
    a storage which stores data having actual VSB mode information among the parallel data upon receiving a second enable signal, and outputs the stored data as a VSB mode signal;
    a comparator which compares the parallel data input to the storage with the stored data of the storage when the error detecting unit detects no error; and
    a confidence counter which increases or decreases a confidence value according to the compared result, and outputs the second enable signal to the storage when the confidence value meets a predetermined condition.

9. A digital receiver of claim 1, wherein the second VSB mode detector comprises:
    a code bit extracting unit which extracts and outputs a most significant bit having code information from the input digital signal;

a series/parallel converting unit which sequentially delays code bits serially output by the code bit extracting unit for a prescribed period and outputs in parallel the delayed code bits according to a first enable signal;

an error detecting unit which detects a presence of error in the parallel data output by the series/parallel converting unit;

a storage which stores data having actual VSB mode information among the parallel data upon receiving a second enable signal, and outputs the stored data as a VSB mode signal;

a comparator which compares the parallel data input to the storage with the stored data of the storage when the error detecting unit detects no error; and a confidence counter which increases or decreases a confidence value according to the compared result, and outputs the second enable signal to the storage when the confidence value meets a predetermined condition.

10. A method for detecting a VSB mode in a digital TV receiver, comprising:

(a) detecting a first VSB mode from an input digital signal;

(b) channel equalizing the input digital signal at a channel equalizer to remove ghost noise existing in the channel and outputting a channel-equalized signal excluding the ghost noise;

(c) receiving the channel-equalized signal excluding the ghost noise and detecting a second VSB mode from the channel-equalized signal excluding the ghost noise;

(d) comparing the first and second VSB mode signals and generating a select signal according to the compared result; and (e) selecting and outputting to the channel equalizer one of either the first VSB mode signal or the second VSB mode signal based upon the select signal.

11. A method of claim 10, wherein the (a) and (b) each comprises:

extracting and outputting a most significant bit having code information from the input digital signal;

sequentially delaying the serially output code bits for a prescribed period and outputting in parallel the delayed code bits according to a first enable signal;

detecting a presence of error in the data output in parallel;

storing data having actual VSB mode information among the data output in parallel upon receiving a second enable signal, and outputting the stored data as a VSB mode signal;

comparing the data output in parallel to the stored data when no error is detected; and increasing or decreasing a confidence value according to the compared result, and outputting the second enable signal to the storage when the confidence value meets a predetermined condition.

12. A method of claim 11, wherein a most significant bit having code information is extracted during last eight symbols of the VSB mode signal section in a field synchronizing signal.

13. A method of claim 11, wherein the first enable signal is generated when an extracted code bit of a final VSB symbol output.

14. A method of claim 11, wherein the confidence value is maintained until a next VSB mode signal section when an error is detected.

15. A method of claim 10, wherein in the (d), a first select signal is output to select the first VSB mode signal when the first and second VSB mode are substantially identical, and otherwise a second select signal is output to select the second VSB mode signal.

16. A method of claim 10, wherein the (a) and (c) are performed by different VSB mode detectors.

* * * * *